United States Patent
Mulhauser

(10) Patent No.: US 6,778,365 B2
(45) Date of Patent: Aug. 17, 2004

(54) CHARGING CIRCUIT

(75) Inventor: Dan Mulhauser, Windham, NH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 281 days.

(21) Appl. No.: 10/060,675

(22) Filed: Jan. 30, 2002

(65) Prior Publication Data

US 2003/0141853 A1 Jul. 31, 2003

(51) Int. Cl.[7] .............................................. H02H 7/00
(52) U.S. Cl. ............................ 361/18; 361/86; 361/88
(58) Field of Search .......................... 361/86, 88, 89, 361/90, 18; 607/4, 5, 7

(56) References Cited

U.S. PATENT DOCUMENTS

| | | | | |
|---|---|---|---|---|
| 4,070,699 A | | 1/1978 | Einbinder | |
| 4,272,806 A | * | 6/1981 | Metzger | ................... 363/21.17 |
| 5,447,522 A | * | 9/1995 | Chang et al. | ................... 607/7 |
| 5,485,361 A | | 1/1996 | Sokal | |
| 5,527,346 A | * | 6/1996 | Kroll | ............................. 607/5 |
| 5,594,287 A | * | 1/1997 | Cameron | ................. 307/132 E |
| 5,836,973 A | * | 11/1998 | Kroll | ............................. 607/5 |
| 5,994,880 A | * | 11/1999 | Dropps | ........................ 320/140 |
| 6,005,370 A | * | 12/1999 | Gustavson et al. | ......... 320/137 |
| 6,426,628 B1 | * | 7/2002 | Palm et al. | .................. 324/427 |

* cited by examiner

Primary Examiner—Stephen W. Jackson
Assistant Examiner—Danny Nguyen

(57) ABSTRACT

A charging circuit, and method of performing the same, having a primary switching circuit that controls the transfer of energy between windings in a transformer based upon a reconstruction of a secondary winding current, in a primary winding side of the transformer, without directly sampling the secondary winding current, such that the secondary winding is isolated from the primary winding. The reconstruction of secondary winding current is performed by sampling a voltage across the primary winding reflected from the secondary winding, and integrating the sampled voltage using a current source driven according to the sampled voltage and a capacitor. The primary switching circuit operates to turn on an energizing of the primary winding when the integrated sampled voltage indicates that the flux density of the transformer, after a transfer of energy between primary and secondary windings, lowers to a predetermined level.

20 Claims, 2 Drawing Sheets

CHARGING CIRCUIT

BACKGROUND OF THE INVENTION

1. Field of the Invention

The present invention relates to a charging circuit. More specifically, the present invention relates to a charging circuit, and method of implementing the same, that can be used in a defibrillator with a more efficient charge time.

2. Description of the Related Art

FIG. 1 illustrates a conventional charging system having a step-up voltage capability using two linked inductive windings, e.g., a transformer, primary winding 10 and secondary winding 12, between a charging voltage source 20 and a utilization device 40. This arrangement was disclosed in FIG. 1 of U.S. Pat. No. 4,070,699, to Einbinder. As set forth in U.S. Pat. No. 4,070,699, to charge capacitor 30, switching circuit 14 is closed and voltage is applied across primary winding 10. Switching circuit 14 is then opened and the energy accumulated in primary winding 10 is transferred to secondary winding 12, charges capacitor 30, which ultimately supplies voltage to utilization device 40. Likewise, upon a closing of switching circuit 14, energy transfers back from secondary winding 12 to primary winding 10. Energy is basically in one winding at a time. U.S. Pat. No. 4,070,699 also notes that it is beneficial to prevent current in the circuit containing secondary winding 12, diode 18, and capacitor 30 from reaching a zero level, which would result in the flux density for primary and secondary windings 10 and 12 going to zero. The benefit of keeping the flux density between primary and secondary windings 10 and 12 sufficiently high is that greater power can be transferred between inductors 10 and 12. To accomplish this, U.S. Pat. No. 4,070,699 recommends closing switching circuit 14 when current in the secondary winding 12 circuit drops to a predetermined level. Usually this level corresponds to the flux density for the primary and secondary windings dropping to two thirds of the saturation level.

Some recent charging systems allow the flux density between primary and secondary windings 10 and 12 to drop to zero by waiting a predetermined time before closing the switching circuit, this predetermined time is meant to correspond to a period of time at which the current flow in secondary winding 12 would typically have extinguished. Thus, though less efficient, recent charging systems typically allow current flow in secondary winding 12 to be extinguished since it is difficult to determine the current flow in secondary winding 12 without permeating noise into circuits connected to secondary winding 12. Utilization device 40 could include delicate sensors for measuring vital health statistics of a patient, for example, when the charging system is for a defibrillator. Thus, recently it has become more important to have secondary winding 12 mostly isolated from primary winding 10, rather than have a more efficient transfer of power between primary and secondary windings 10 and 12. Magnetic field sensing circuit 16, illustrated in FIG. 1, does not allow for such recently necessitated isolation between primary and secondary windings 10 and 12. In addition, although isolation between primary and secondary windings 10 and 12 is important, most recent charging circuits do not have truly isolated primary and secondary windings 10 and 12 since they attempt to sample the voltage in the secondary winding circuitry using a resistor bridge between the circuits connected to primary and secondary windings 10 and 12, which in actuality is not an isolation of primary and secondary windings 10 and 12, though the resistor bridge is designed to minimize cross talk between the circuits connected to primary and secondary windings 10 and 12 as much as possible.

Thus, what is needed is an improved charging system that has a more efficient transfer of power and a truly isolated primary and secondary sides.

SUMMARY OF THE INVENTION

To solve the above and other aspects, it is an object of the present invention to provide an improved charging circuit, and method for implementing the same, including a primary switching circuit that controls the transfer of energy between windings in a transformer based upon a reconstruction of a secondary winding current, using a voltage across a primary winding of the transformer, without directly sampling the secondary winding current.

A further object of the present invention is to provide a charging circuit having a transformer having at least primary and secondary windings and a switch to cease an energy transfer between the primary and secondary windings based upon a reconstruction of an unsampled energy level in the secondary winding.

Another object of the present invention is to provide a charging circuit having a transformer having at least primary and secondary windings and a switch to cease an energy transfer between the primary and secondary windings based upon a reconstruction of an unsampled energy level in the secondary winding, wherein the switch ceases the energy transfer when the reconstructed energy level in the secondary winding is a current indicating that a flux density in the transformer has lowered to a predetermined flux density level.

An additional object of the present invention is to provide a charging circuit having a transformer including at least primary and secondary windings and a switch to control a charging of the primary winding until an energy level in the primary winding reaches a predetermined charging level and to control a transfer of energy between the primary and secondary winding until a reconstructed energy level, of an unsampled energy level in the secondary winding, indicates that that a flux density of the transformer has lowered to a predetermined flux density level.

An additional object of the present invention is to provide a charging circuit having a transformer including at least primary and secondary windings and a switch to control a charging of the primary winding until an energy level in the primary winding reaches a predetermined charging level and to control a transfer of energy between the primary and secondary winding until a reconstructed energy level, of an unsampled energy level in the secondary winding, indicates that that a flux density of the transformer has lowered to a predetermined flux density level, wherein the reconstructed energy level is generated by sampling a voltage representative of a voltage across the primary winding and integrating the sampled voltage.

Another object of the present invention is to provide a charging method, including charging a primary winding of a transformer until an energy level of the primary winding reaches a predetermined charge level, and transferring energy between the primary winding and a secondary winding of the transformer until a reconstructed energy level, of an unsampled energy level of the secondary winding, reaches a predetermined energy level.

Another object of the present invention is to provide a charging method, including charging a primary winding of a transformer until an energy level of the primary winding reaches a predetermined charge level, transferring energy between the primary winding and a secondary winding of the transformer until a reconstructed energy level, of an unsampled energy level of the secondary winding, reaches a predetermined energy level, initiating the charging of the primary winding after the transferring of energy between the primary winding and the secondary winding has ceased, and repeating the charging of the primary winding, the transferring of the energy between the primary winding and the secondary winding, and the initiating of the charging of the primary winding until a total charge amount is accumulated in a circuit connected to the secondary winding.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE PREFERRED EMBODIMENTS

Figure 1:
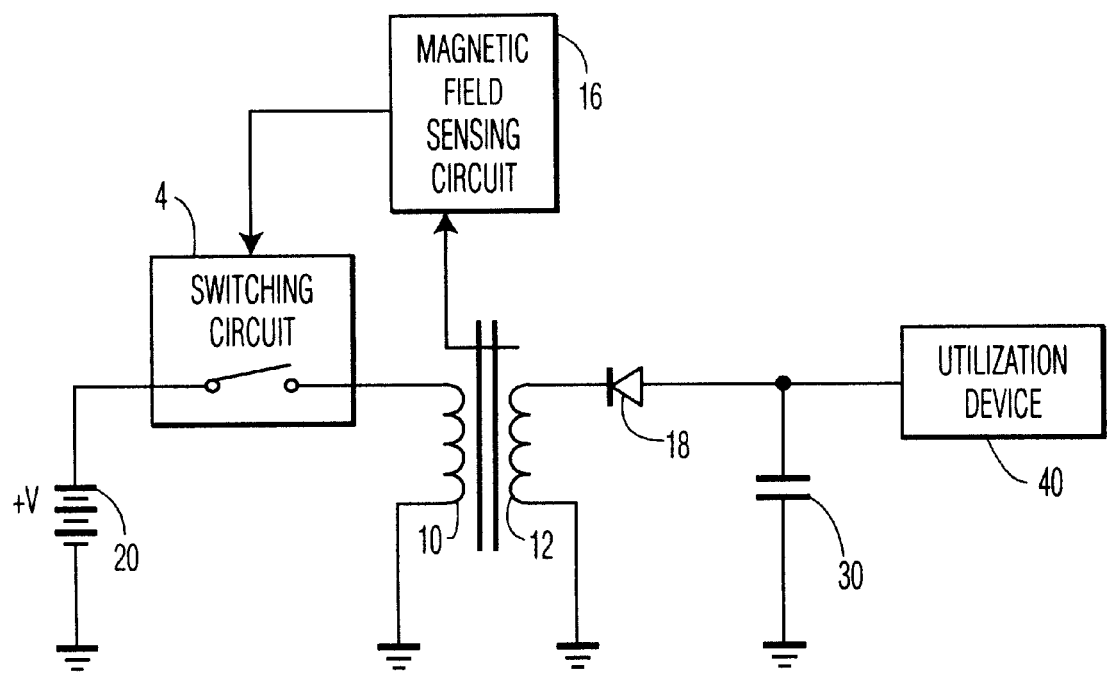
FIG. 1 is an illustration of a conventional charging system.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

As noted above, recently, charging circuits have been designed using a step-up transformer and a switching circuit designed to open or close based on a sampled current on a secondary side of the transformer, i.e., a circuit connected to a secondary winding of the transformer. As will be disclosed below, embodiments of the present invention include a transformer, having at least primary and secondary windings, and a switching circuit, where the switching circuit reconstructs a current of the secondary winding by using information detected on the primary side of the transformer, i.e., the circuits connected to the primary winding, without sampling a current on the secondary side. The switching circuit closes based on the reconstructed current. Thus, since the current of the secondary winding is reconstructed on the primary side of the transformer, without sampling the current in the secondary winding, the primary and secondary windings are isolated.

Figure 2:
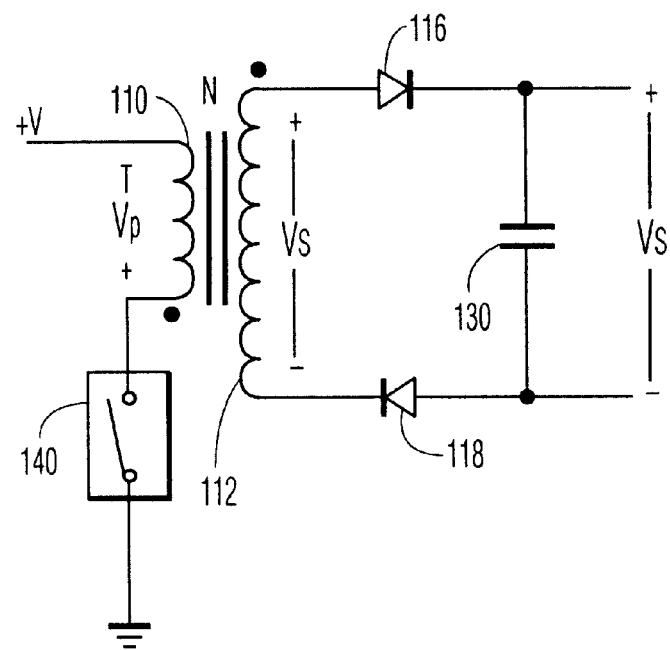
FIG. 2 is a illustration of an embodiment of the present invention showing a transformer having primary and secondary windings, a primary switch, and a secondary capacitor.

FIG. 2 illustrates an embodiment of the present invention where a transfer of energy between a primary winding 110 and a secondary winding 112 is controlled by opening or closing a primary switch 140. Initially, voltage +V is applied to primary winding 110 when primary switch 140 is closed. When energy in primary winding 110 is at a maximum, or predetermined, level primary switch 140 opens. The maximum or predetermined level is usually based on the current level that borderlines on putting a core of the transformer into saturation. The maximum or predetermined level could also be a range of acceptable levels. Alternatively, a timing circuit could also be utilized to open primary switch 140 upon a predetermined timing, which would also be commensurate with the predetermined level. Based upon the turns ratio N between primary and secondary windings 110 and 112 a voltage Vs is generated across secondary winding 112. Similarly, a voltage Vp is reflected across primary winding 110 from secondary winding 112, based on turns ratio N. Voltage Vs is then rectified by diodes 116 and 118 and ultimately a voltage Vsc is generated across capacitor 130. When a flux density in the transformer drops a predetermined amount, preferably to ⅔ of a flux density saturation level for the primary and secondary windings 110 and 112, primary switch 140 will be closed and energy will again be accumulated in primary winding 110. The flux density level of the transformer, based primarily on the current flowing through secondary winding 112, is determined based upon the reflected voltage Vp across primary winding 110.

Again, when the energy in primary winding 110 is at a maximum, or predetermined, level primary, switch 140 will open, and the energy accumulated in primary winding 110 will transfer to secondary winding 112. Typically, this cycle is repeated until voltage Vsc reaches a predetermined level. In a defibrillator example, voltage +V may be 12 volts and turns ratio N may be 1:34.3. In this defibrillator example, when energy accumulates in primary winding 110 to a sufficient level, primary switch 140 opens and energy is transferred from primary winding 110 to secondary winding 112. Voltage Vs may eventually be 2010 volts upon the opening of primary switch 140, and with a loss of 5 volts across each of diodes 116 and 118, resulting in voltage Vsc being 2000 volts. Based upon turns ratio N being 1:34.3, voltage Vs (2010 volts) will be reflected back across primary winding 110 and reflected voltage Vp across primary winding 110 will be approximately 58.6 volts initially. Voltage Vs will increase as more energy is being accumulated in capacitor 130, which corresponds to reflected voltage Vp also increasing a corresponding amount. Based upon reflected voltage Vp, the flux density level in the transformer can be observed, such that primary switch 140 can be closed when the flux density level lowers to a predetermined amount, i.e., the operation of primary switch 140 can be based on reflected voltage Vp so no direct sampling of current of secondary winding 112 is necessary. Thus, switch 140 can be operated with isolated primary and secondary windings 110 and 112, whereas conventional charging systems necessitated some type of bridging between primary and secondary windings 110 and 112, and thus were not truly isolated.

Figure 3:
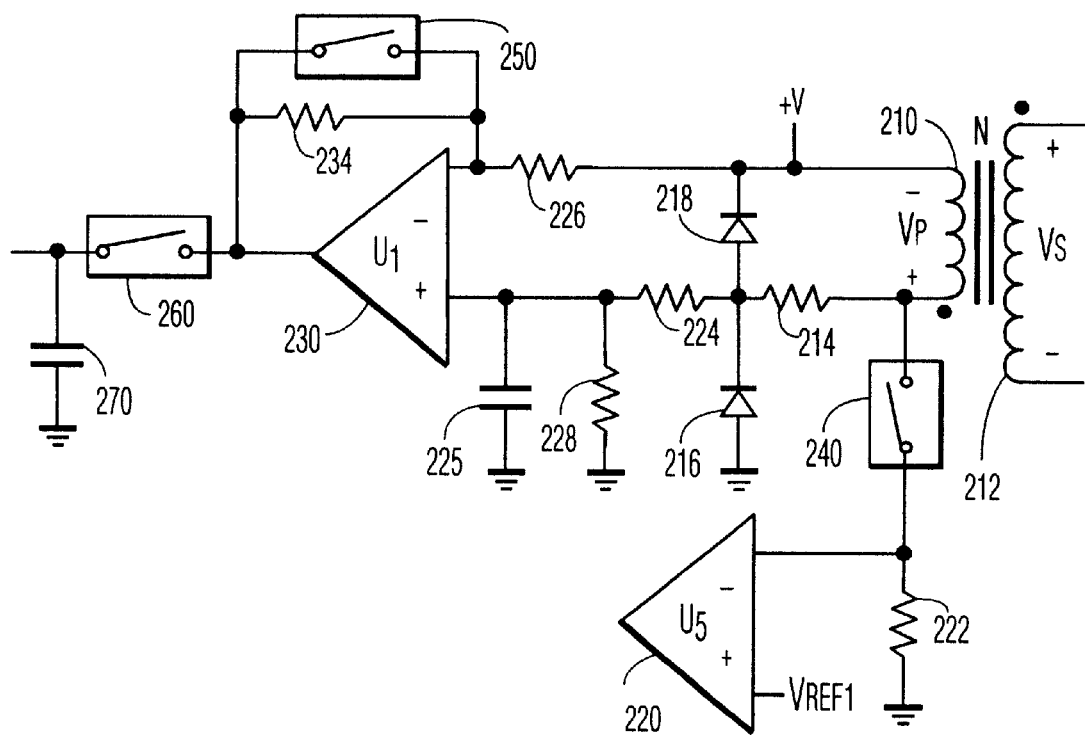
FIG. 3 is an illustration of an embodiment of the present invention showing primary and secondary windings, a primary switch, a differential amplifier, and a sample and hold capacitor.

FIG. 3 illustrates another embodiment of the present invention including a sample and hold circuit using a differential amplifier. Similarly to FIG. 2, a primary switch 240 controls when primary winding 210 transfers accumulated energy to secondary winding 212. Comparator 220 (U5) determines when a voltage across resistor 222 exceeds a reference voltage $V_{Ref1}$. The moment when the voltage across resistor 222 exceeds $V_{Ref1}$ is representative of the point when current in primary winding 210 has reached a maximum amount, i.e., indicative of when primary winding 210 has accumulated a maximum amount of energy before forcing a core of the transformer into saturation. When comparator 220 (U5) indicates that primary winding 210 has accumulated the maximum amount of energy, a signal output from comparator 220 (U5) is sent to primary switch 240 to open primary switch 240, thereby initiating the transfer of energy from primary winding 210 to secondary winding 212.

After primary switch 240 is opened and the transfer of energy from primary winding 210 to secondary winding 212 is initiated, the charging circuit must determine when to close primary switch 240 again. As noted above, the preferential point when primary switch 240 should be closed is when a reflected voltage Vp across primary winding 210 indicates that a current in secondary winding 212 has reduced to a level corresponding to a flux density of the transformer being around two thirds of a flux density saturation level.

Thus, FIG. 3 illustrates a sample and hold circuit including capacitor 270 and switch 260. Switch 260 closes after primary switch 240 opens, and preferentially after a slight delay after the opening of primary switch 240, as a spike in voltage will typically be generated directly after the initiation of transfer of energy between primary winding 210 and secondary winding 212. The spike is generated in the circuit connected to primary winding 210 because some of the energy stored in a leakage inductance of primary winding 210 does not couple to secondary winding 212.

After switch 260 closes, capacitor 270 will sample a voltage output from a differential amplifier including operational amplifier 230 (U1). As illustrated in FIG. 3, the differential amplifier preferentially includes resistor 214, diode 218, diode 216, resistor 224, resistor 228, capacitor 225, resistor 226, and operational amplifier 230 (U1) and it's related circuitry, including resistor 234. To protect the differential amplifier, switch 250 may also be utilized as illustrated. Switch 250 helps protect the differential amplifier by only closing after switch 260 is opened and primary switch 240 is closed. By bypassing operational amplifier 230 (U1) using switch 250, when primary switch 240 is closed, a gain produced by operational amplifier 230 (U1) can be reduced to help stop operational amplifier 230 (U1) from swinging far negative or to a rail when charging primary winding 210.

Thus, using the differential amplifier and sample and hold circuit illustrated in FIG. 3, a voltage commensurate with the voltage Vp across primary winding 210 can be sampled and stored in capacitor 270. The voltage across capacitor 270 may then be used to determine the current operation in secondary winding 212, for determining when to close primary switch 240, and begin the charging cycle all over again.

In a preferential embodiment, the value for resistor 214 was determined to be 8.85 k ohms, the value for resistor 224 was determined to be 1.115 k ohms, the value for resistor 228 was determined to be 510 ohms, the value for resistor 226 was determined to be 10 k ohms, and the value for resistor 234 was determined to be 510 ohms.

Figure 4:
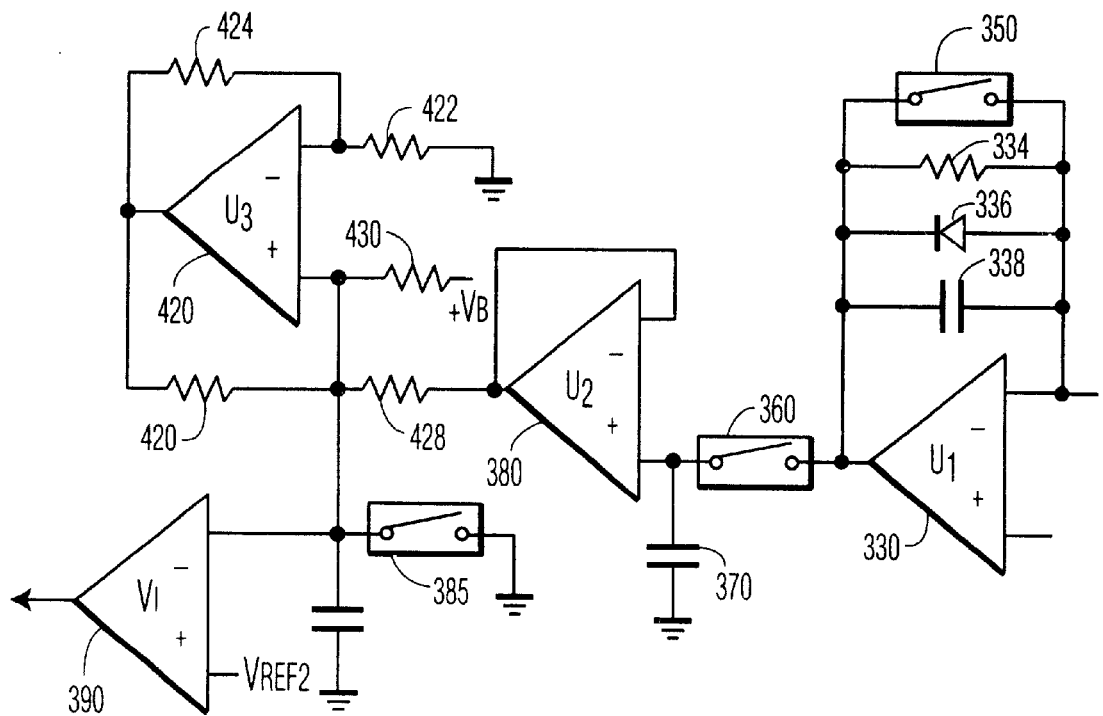
FIG. 4 is an illustration of an embodiment of the present invention showing a sample and hold capacitor, a buffer, and a current source and capacitor forming an integrator.

FIG. 4 illustrates a further embodiment of the present invention including a sample and hold circuit, a buffer, a current source, and a comparator to determine when to close the primary switch illustrated in the previous embodiments. As illustrated in FIG. 4, operational amplifier 330 (U1) operates similarly to operational amplifier 230 (U1) illustrated in FIG. 3, by supplying capacitor 370 with a voltage commensurate with a voltage across a primary winding. In the embodiment illustrated in FIG. 4, operational amplifier 230 (U1) also includes switch 350, diode 336, resistor 334, and capacitor 338. Similarly to the embodiment shown in FIG. 3, switch 350 and diode 336 can help protect operational amplifier 330 (U1) from railing when the primary switch is closed and the primary winding is being charged, though both switch 350 and diode 336 are not necessary. Capacitor 338 acts merely as a small filter. In addition, also similarly to FIG. 3, switch 360 closes after a delay upon the opening of the primary switch, thereby allowing capacitor 370 to sample the voltage output from operational amplifier 330 (U1).

Operational amplifier 380 (U2) operates as a buffer to transfer the voltage across capacitor 370 to the current source. The buffer operation of operational amplifier 380 (U2) helps prevent capacitor 370 from discharging into the remaining circuitry after capacitor 380, including the current source, when switch 360 is open during the charging of the primary winding. The current source includes operational amplifier 420 (U3) and resistors 422, 424, 426 and 428. Thus, the current source generates a current commensurate with the voltage across capacitor 370, which is commensurate with the voltage across the primary winding, which is also commensurate with the current flow in a secondary winding, which is representative of the current density of the secondary winding.

Switch 385 is closed when the primary switch is closed, thereby drawing the current from the current source to ground and keeping capacitor 395 from charging. When the primary switch is opened and energy is transferred from the primary winding to the secondary winding, switch 385 opens and capacitor 395 is charged. The current source and capacitor 395 act together as an integrator of the voltage output by operational amplifier 380 (U2). The voltage across capacitor 395, over time, will thus have a signal shape and form related to the current in the secondary winding, over time. Typically, current in the secondary winding, after the primary switch has opened and energy in the primary winding has transferred to the secondary winding, will reduce in a ramped linear form as the flux density in the transformer decreases. By having the current source charge capacitor 395, when the energy is being transferred from the secondary winding to output capacitor 130 of FIG. 2, the voltage across capacitor 395 will increase in a ramped manner proportional to the decreasing current in the secondary.

Comparator 390 compares the voltage across capacitor 395 and a reference voltage $V_{Ref2}$. When the voltage across capacitor 395 exceeds $V_{Ref2}$ comparator 390 sends a signal to the primary switch indicating that the primary switch should close and begin charging the primary winding again. $V_{Ref2}$ is determined based on the known value of the known inductance of the secondary winding and the capacitance of capacitor 395. Thus, $V_{Ref2}$ can be preset to correspond to a corresponding level of current in the secondary winding, such that when the voltage across capacitor 395 exceeds $V_{Ref2}$ the current in the secondary winding will have reduced to a predetermined level, e.g., a level commensurate with two thirds of the saturation flux density for the transformer.

In a preferential embodiment, resistors 422, 424, 426 and 428 are all 100 k ohms. Additionally, in a preferential embodiment, capacitor 370 has a value of 0.01 µf, and capacitor 395 will have a value of 100 pf.

In addition, in a further preferred embodiment, a high resistance resistor 430 may be connected to the current source and a bias voltage $+V_B$. Using resistor 430 allows for some offset in the circuit such that at higher output voltages the circuit will allow the flux density to decrease below two thirds. This reduces stress on the primary switch and secondary diodes. Running at the high flux density at higher output voltages is not as necessary as the higher voltage collapses the field faster anyway.

Thus, embodiments of the present invention permit the operation of a charging circuit with an isolated secondary winding in a more efficient manner than conventional charging circuits. As noted above, the opening and closing of the primary switch can be based solely on voltages detected across a primary winding. Thus, sampling of voltages, to control the primary switch, in the circuit of the secondary winding, is not necessary.

In addition to being applicable to defibrillators, embodiments of the present invention would also be applicable to charging systems requiring improved charging rates or power transfer, e.g., photographic flash lamps or pulsed laser systems.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Similarly, although the preferred embodiments of the present invention have been illustrated and discussed herein as including at least some operational amplifiers, a differential amplifier, a buffer, and a current source, one of ordinary skill in the art could readily adapt and modify the present invention to perform similar operations of reconstructing the current in a secondary winding of a transformer or flux density in the transformer so a direct sampling of the same is not necessary, thereby allowing the secondary winding to be isolated from the primary winding.

Further, although only primary and secondary windings have been disclosed herein, additionally windings may be utilized as necessary. Similarly, although several different switches have been disclosed, such switching operation could be controlled by a single or multiple controller. Likewise, operations of a single switch, e.g., the operation of the primary switch to turn on the charging of the primary winding and the transfer of energy to the secondary winding, could be implemented in multiple switches. Thus, herein, unless specifically indicated, where the term "switch" is utilized it may be interpreted as a single switch or multiple switches. Lastly, although embodiments of the present invention may be described as performing a switching operation based on a reconstruction of an unsampled energy level in the secondary winding, the use of the term "unsampled" refers only to sampling of the secondary winding to determine the energy level, or an energy level commensurate thereto, in the secondary winding for such switching operation.

What is claimed is:

1. A charging circuit, comprising:
   a transformer having at least primary and secondary windings; and
   a switch to cease a transfer of energy from the secondary winding to a system connected to the secondary winding based upon a reconstruction of an unsampled energy level in the secondary winding,
   wherein the switch ceases the energy transfer when the reconstructed energy level in the secondary winding is a current indicating that a flux density in the transformer has lowered to a predetermined flux density level is level is two thirds of a flux density saturation level for the transformer.

2. The charging circuit of claim 1, wherein the switch further operates to cease a charging of energy in the primary winding when the energy level in the primary winding reaches a predetermined charging level.

3. The charging circuit of claim 1, wherein the reconstruction of the energy level in the secondary winding includes sampling a voltage representative of a voltage across the primary winding reflected from the secondary winding and integrating the sampled voltage to determine the energy level in the secondary winding.

4. The charging circuit of claim 3, wherein the integrating of the sampled voltage includes inputting the sampled voltage to a current source and applying a current generated by the current source to a capacitance.

5. The charging circuit of claim 3, wherein switch operates to cease the energy transfer when the integrated sampled voltage exceeds a predetermined integration level.

6. A charging circuit, comprising:
   a transformer including at least primary and secondary windings; and
   a switch to control a charging of the primary winding until an energy level in the primary winding reaches a predetermined charging level and to control a transfer of energy between the primary and secondary winding based upon when a reconstructed energy level, of an unsampled energy level in the secondary winding, indicates that that a flux density of the transformer has lowered to a predetermined flux density level,
   wherein the reconstructed energy level is generated by sampling a voltage representative of a voltage across the primary winding and integrating the sampled voltage and the integrating of the sampled voltage includes inputting the sampled voltage to a current source and applying a current generated by the current source to a capacitance.

7. The charging circuit of claim 6, wherein the sampled voltage is buffered before being integrated.

8. The charging circuit of claim 6, wherein the reconstructed energy level is generated by inputting a sampled voltage representative of a voltage across the primary winding to a current source and basing the reconstruction of the energy level on a current generated by the current source.

9. The charging circuit of claim 6, wherein the sampling of the voltage is accomplished by using a sample and hold and a differential amplifier.

10. The charging circuit of claim 6, wherein the unsampled energy level is not reconstructed when the primary winding is charging.

11. The charging circuit of claim 6, wherein the charging circuit is utilized in a defibrillator.

12. The charging circuit of claim 6, wherein the secondary winding is isolated from the primary winding.

13. A charging method, comprising:
   charging a primary winding of a transformer until an energy level of the primary winding reaches a predetermined charge level; and
   transferring energy between the primary winding and a secondary winding of the transformer based upon when a reconstructed energy level, of an unsampled energy level of the secondary winding, reaches a predetermined energy level,
   wherein the reconstructed energy level is generated by inputting a sampled voltage representative of a voltage across the primary winding to a current source and basing the reconstruction of the energy level on a current generated by the current source.

14. The charging method of claim 13, further comprising:

initiating an additional charging of the primary winding after a transfer of energy from the primary winding to the secondary winding based upon the reconstructed energy level; and repeating the transferring of the energy between the primary winding and the secondary winding, and the initiating of the additional charging of the primary winding until a total charge amount is accumulated in a circuit connected to the secondary winding.

15. The charging method of claim 13, wherein the reconstructed energy level is generated by sampling a voltage representative of a voltage across the primary winding and integrating the sampled voltage.

16. The charging method of claim 15, wherein the integrating of the sampled voltage includes inputting the sampled voltage to a current source and applying a current generated by the current source to a capacitance.

17. The charging method of claim 13, further comprising:

storing the transferred energy in a circuit connected to the secondary winding.

18. The charging circuit of claim 1, wherein said charging circuit is part of a defibrillator.

19. The charging circuit of claim 6, wherein said charging circuit is part of a defibrillator.

20. The charging method of claim 1, wherein said charging method is used for charging a defibrillator.

* * * * *